United States Patent [19]

Kelm et al.

[11] Patent Number: 4,534,166

[45] Date of Patent: Aug. 13, 1985

[54] FLOW MODIFYING DEVICE

[75] Inventors: James S. Kelm, Milford; Edward C. Vickers, Cincinnati; Jesse J. Williams, Cincinnati; Jack R. Taylor, Cincinnati, all of Ohio

[73] Assignee: The United States of America as represented by the Administrator of the National Aeronautics and Space Administration, Washington, D.C.

[21] Appl. No.: 500,651

[22] Filed: Jun. 3, 1983

Related U.S. Application Data

[63] Continuation-in-part of Ser. No. 192,677, Oct. 1, 1980, abandoned.

[51] Int. Cl.³ .................... F02C 9/00

[52] U.S. Cl. .................... 60/39.23; 60/748; 239/402.5

[58] Field of Search .................... 60/39.23, 748; 239/402.5

[56] References Cited

U.S. PATENT DOCUMENTS

| | | | |
|---|---|---|---|
| 3,078,672 | 2/1963 | Meurer | 60/39.71 |
| 3,490,230 | 1/1970 | Pillsbury et al. | 60/39.65 |
| 3,608,309 | 9/1971 | Hill et al. | 60/39.65 |
| 3,703,259 | 11/1972 | Sturgess et al. | 239/400 |
| 3,853,273 | 12/1974 | Bahr et al. | 239/402 |
| 4,070,826 | 1/1978 | Stenger et al. | 60/39.66 |
| 4,084,371 | 4/1978 | Howald | 60/39.36 |
| 4,085,579 | 4/1978 | Holzapfel et al. | 60/39.04 |
| 4,089,638 | 5/1978 | Trucco et al. | 431/209 |

FOREIGN PATENT DOCUMENTS

| | | | |
|---|---|---|---|
| 619353 | of 0000 | United Kingdom | 60/39.23 |

*Primary Examiner*—Carlton R. Croyle
*Assistant Examiner*—Jeffrey A. Simenauer
*Attorney, Agent, or Firm*—Derek P. Lawrence; Gregory A. Welte; John R. Manning

[57] ABSTRACT

A swirler for a gas turbine engine combustor is disclosed for simultaneously controlling combustor flow rate, swirl angle, residence time and fuel-air ratio to provide three regimes of operation. A first regime is provided in which fuel-air ratio is less than stoichiometric, NOx is produced at one level, and combustor flow rate is high. In a second regime, fuel-air ratio is nearly stoichiometric, NOx production is less than that of the first regime, and combustor flow rate is low. In a third regime, used for example at lightoff, fuel-air ratio is greater than stoichiometric and the combustor flow rate is less than in either of the other regimes.

4 Claims, 11 Drawing Figures

FLOW MODIFYING DEVICE

This is a continuation-in-part of application Ser. No. 192,677, filed Oct. 1, 1980, now abandned.

BACKGROUND OF THE INVENTION

The invention herein described was made in the performance of work under a NASA contract and is subject to the provisions of Section 305 of the National Aeronautics and Space Act of 1958, Public Law 85-568 (72 Stat. 435; 42 USC 2457).

1. Field of the Invention

This invention relates to flow modifying devices and particularly to a new and improved fluid flow modifying device in which the amount and direction of discharge of the fluid from the device can be varied.

2. Description of the Prior Art

Many combustion chamber within gas turbine engines employ flow modifying devices, such as swirlers, to mix fuel and air and to aid in distributing the resultant mixture within the combustion chamber. The swirlers impart a swirling motion to the air. The swirling air increases the tendency of the fuel to atomize, causing better mixing and thus more efficient burning of the mixture in the combustion chamber.

However, many currently used swirlers have a fixed geometry. That is, the amount and the direction of discharge, or swirl angle, of air from the swirler is relatively constant, regardless of the amount of fuel which is injected into the combustion chamber.

For reasons of reducing objectionable gaseous emissions and improving combustor effciency, it is desirable to be able to vary the amount of air which mixes with the fuel and to vary the swirl angle of the air as it leaves the swirler. For example, when the engine is running at idle, it is preferable that there be a rich fuel-air mixture, that is, a high fuel to air ratio, in the primary combustion zone and that the residence time of the mixture within the primary zone be relatively long. The primary combustion zone comprises approximately the upstream third of the combustion chamber. Such a rich mixture reduces CO and HC emission levels at idle, and also enhances altitude relight capability. Correspondingly, with low airflow through the combustor, as would occur with a rich mixture at idle, a higher swirl angle is needed to atomize the fuel properly.

On the other hand, at higher power operating conditions, it is preferable to have a lean fuel-air mixture, that is, a low fuel to air ratio, and to have a lower swirl angle in order to distribute the mixture more uniformly throughout the combustion chamber. This results in reduced NOx and visible smoke emissions. Furthermore, with a lean mixture at higher power conditions, less of a swirl angle is required to properly atomize the fuel.

One approach which has been employed to vary the fuel-air ratio is a two-stage, or double-annular, combustion system. In such a system, a pilot dome produces a rich mixture for operation at idle engine conditions, while a second dome or mixing chute assembly provides lean mixtures at higher power conditions. Although such two-stage combustion systems are preferable to combustors employing single, fixed geometry swirlers, they can be complex and expensive to fabricate, and can add a significant amount of weight to the engine.

Another approach to varying the fuel-air ratio has been the use of a shutter assembly for opening and closing air scoops, the openings of which are normal to the flow of compressed air from the compressor. Such shutter assemblies, however, often have no positions intermediate the open and closed positions. Furthermore, while they may vary the amount of air entering the combustion chamber, they fail to provide a corresponding variation in the swirl angle of the air. Another drawback of shutter assemblies in which the openings of the scoops are disposed normal to the air flowing from the compressor is that the compressed air exerts heavy stresses directly against the elements of the shutter assembly. In order to avoid leakage and prevent damage, the elements must be fabricated so as to withstand such stresses, which can in turn result in increased cost and weight.

In view of the above problem, it is therefore an object of the present invention to provide a flow modifying device, particularly adaptable to a combustion chamber, which can vary the amount of air discharged from it, and therefore the fuel-air ratio, to improve combustor efficiency and reduce undesirable gaseous emissions.

Another object of the present invention is to provide a flow modifying device in which the direction of discharge, or swirl angle, of the air can be varied in relation to the amount of air which is discharged from the device in order to improve fuel-air mixing and distribution.

Yet another object of the present invention is to provide a flow modifying device which is relatively simple and inexpensive.

Still another object of the present invention is to provide a flow modifying device having elements arranged so that, when the device is employed in a combustion chamber located in the path of a flow of compressed air, the elements of the device are substantially protected from stresses exerted by the compressed air.

SUMMARY OF THE INVENTION

A swirler for a gas turbine engine combustor is disclosed for simultaneously controlling combustor flow rate, swirl angle, residence time and fuel-air ratio to provide three regimes of operation. A first regime is provided in which fuel-air ratio is less than stoichiometric, NOx is produced at one level, and combustor flow rate is high. In a second regime, fuel-air ratio is nearly stoichiometric, NOx production is less than that of the first regime, and combustor flow rate is low. In a third regime, used for example at lightoff, fuel-air ratio is greater than stoichiometric and the combustion flow rate is less than in either of the other regimes.

BRIEF DESCRIPTION OF THE DRAWING

This invention will be better understood from the following description taken in conjunction with the accompanying drawing, wherein.

DESCRIPTION OF THE PREFERRED EMBODIMENT

Figure 1:
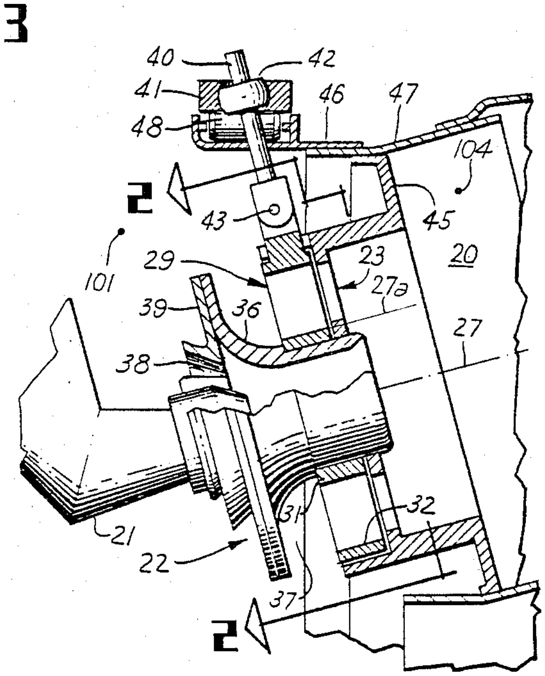
FIG. 1 is a fragmentary cross-sectional view of a combustion chamber and a swirler incorporating features of the present invention.

Turning now to a consideration of the drawing, and in particular to FIG. 1, there is shown the upstream portion of a combustion chamber (combustor) 20 in a gas turbine engine. A mixture of air and fuel enters and is burned within the combustion chamber 20. The energy of the resulting exhaust gases is extracted to perform work, such as to rotate a turbine (not shown).

The fuel for combustion is introduced from the pressurized fuel nozzle 21. As the fuel exits the fuel nozzle 21, it is mixed with air in the swirler 22 and the resulting mixture enters the combustion chamber 20 to be burned. The swirler 22 imparts a swirling motion to the air flowing through it and thus to the fuel emitted from the fuel nozzle 21 which mixes with the air causing atomization of the fuel and thereby promoting better mixing.

Figure 6:
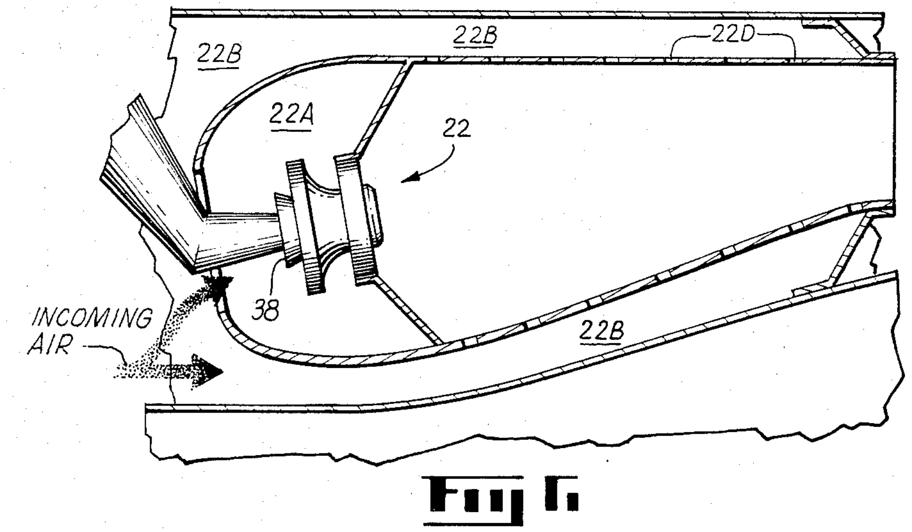
FIG. 6 is a schematic view of a gas turbine engine combustor.

As shown in FIG. 6, incoming air enters a plenum 22B. The air can exit the plenum only at three locations: through the swirler 22 of the present invention, through venturis 38 (which can provide a swirling airstream in the opposite direction to that provided by the present invention), or through dilution holes 22D. Thus, an increase in airflow through one exit location must result in a decrease in airflow through one of the others. The present invention allocates airflow among these three exits in a manner which will become clear in the following discussion.

The present invention comprises a flow modifying device, such as the swirler 22, which receives at least a portion of its fluid from a generally radial direction and discharges that fluid in a generally axis direction and which can vary the amount and direction of the discharge of the fluid, such as air, flowing through it. By "radial" it is meant in a direction generally perpendicular to the swirler longitudinal axis, the axis being depicted by the dashed line 27. By "axial" it is meant in a direction generally parallel to the swirler longitudinal axis 27. A radially displaced axis 27*a* is shown in FIG. 1 and and in end view in FIG. 2. The radially displaced axis 27*a* is parallel to the longitudinal axis 27 and serves a reference function which will be described later more fully.

Figure 3:
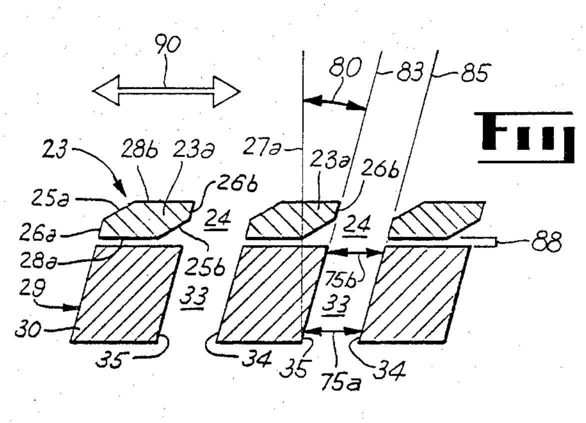
FIGS. 3 through 5 are fragmentary cross-sectional views of the swirler taken along lines 3—3 of FIG. 2 and showing different relative positions of the plate and vane assembly.
Figure 2:
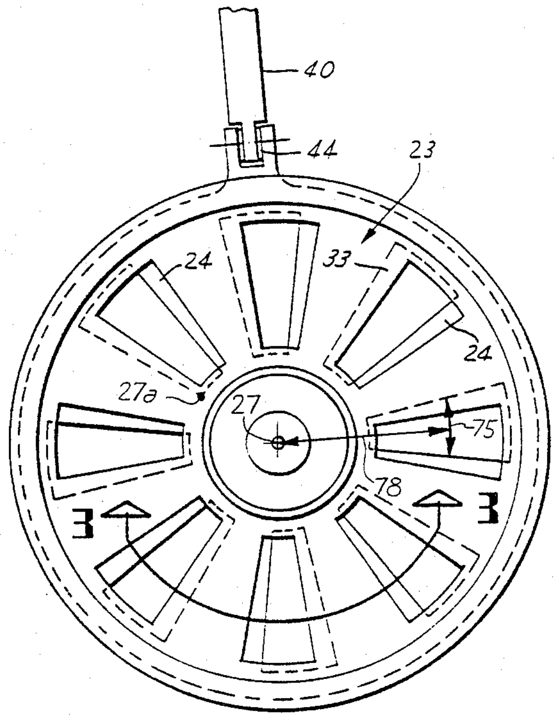
FIG. 2 is a cross-sectional view of a swirler taken along lines 2—2 of FIG. 1.

In a particular embodiment of the invention, a first element, as can be seen in FIGS. 1 and 2, comprises an annular, radially aligned plate 23 and a plurality of axially extending channels 24. Preferably, and as can be seen in FIG. 3, the portions 23*a* of the plate 23 circumferentially adjacent each of the openings 24 include at least one radially extending surface 25*a* or 25*b* which lies in a plane angled from the longitudinal axis 27 of the swirler 22. These portions 23*a* are termed vanes. As will be seen later, in certain relative positions of the first and second elements, the surfaces 25*a* and 25*b* establish the swirl angle imparted to the air as it exits the swirler 22. Thus, the angle which the surfaces 25*a* and 25*b* make with the displaced axis 27*a* is determined by the degree of swirl desired. As can be seen in FIG. 3, the preferred cross-sectional shapes of the portions of the plate 23 circumferentially adjacent each channel 24 is that of a hexagon, that is, three sets of parallel and opposite radially extending surfaces, 25*a* and 25*b*, 26*a* and 26*b*, and 28*a* and 28*b*.

As can be seen in FIGS. 1 and 2, the second element is substantially annular and comprises a vane assembly 29 including a plurality of radially extending vanes 30 which are interconnected at the radially inner and outer ends to annular members 31 and 32 respectively. The vanes 30 are so disposed that an axially extending channel 33 is defined between each pair of vanes.

As can best be seen in FIG. 3, the radially extending surfaces 34 and 35 define the channels 33 and the angle which these surfaces make with the displaced axis 27*a* of the swirler determines at least partially the swirl angle imparted to the air as it exits the swirler 22. This angle should thus be predetermined according to the degree of swirl desired. For reasons to be explained hereinafter, the distance between the surfaces 34 and 35 of adjacent vanes 30 is substantially the same as the width of the surface 28*a* of the plate 23, and the surfaces 34 and 35 of the vanes 30 are parallel to the surfaces 26*a* and 26*b* of the plate 23.

As can be seen in FIG. 1, the swirler 22 includes a hollow hub 36 which is generally annular. The upstream portion of the hub 36 extends generally radially, lying in a plane perpendicular to the swirler longitudinal axis 27. The hub 36 is curved such that the downstream portion, which is disposed radially inward of the plate 23 and of the vane assembly 29, and which hub can be integral or attached with the plate 23, exends generally axially. The vane assembly 29 and the upstream portion of the hub 36 define an annular radially facing air inlet 37 through which a portion of the air for combustion enters the swirler.

The fact that the air enters the variable portion of the swirler 22, that is, the vane assembly 29 and plate 23 portion, from a radial direction rather than axially is advantageous because the vane assembly and plate are thereby protected by the upstream portion of the hub 36 from the stresses which would be exerted by a direct flow of compressed air against them. The upstream portion of the hub 36 can include as integral or attached with it a radially aligned annular disc 39. Fuel for combustion exits the fuel nozzle 21, which extends through a gap in the annular disc 39 of the upstream portion of the hub 36, and flows through the hollow interior of the hub 36 prior to entering the combustion chamber. The swirler can also include a plurality of fluid ducts, such as the venturis 38, in the annular disc 39 of the upstream portion of the hub 36, through which air enters from a generally axial direction and mixes with fuel. Thus, with this arrangement, initial mixing of air and fuel occurs in the interior of the hub 36 as air from the venturis 38 mixes with fuel from the fuel nozzle 21. As this mixture then exits the hub 36, it is further mixed with air from the radial air inlets 37 after it flows through the vane assembly 29 and the plate 23. It is the amount and the direction of discharge of the second source of air, that is, the air entering the swirler radially and flowing through the vane assembly 29 and plate 23, which the present invention can vary.

Varying of the amount and direction of discharge, or swirl angle, of air from the swirler 22, is accomplished by positioning, preferably rotatably, the second element, such as the vane assembly 29, relative to the first element, such as the plate 23. The vane assembly 29 is rotatably mounted on the swirler hub 36. Means for positioning the second element preferably comprise at least one actuatable drive arm 40 connected to the second element, as can be seen in FIGS. 1 and 2. The radially outer portion of the drive arm 40 is connected to means which impart motion to the drive arm. For example, the drive arm 40 can be connected to a unison ring 41 through a spherical bearing 42. The unison ring 41 can be connected with other drive arms 40 associated with other swirlers in the combustion section of the engine such that all of the drive arms will be moved together.

The radially inner end of the drive arm 40 is preferably connected to the vane assembly 29 through a hinge 43. The use of a hinge 43 permits the vane assembly 29 to be rotated even when there is an axial dimensional mismatch between the vane assembly 29 and the unison ring 41. As shown in FIG. 2, the hinge 43 can include shims 44 to permit presetting of the circumferential position of the drive arm 40 to thereby synchronize the position of that drive arm with other drive arms which might be connected with the unison ring 41.

The swirler 22 is connected with the upstream end of the combustion chamber 20 by an appropriate means, such as by welding or bolting flanges 45, extending from the plate 23, to a liner 47 of the combustion chamber. Likewise, the unison ring 41 can be supported by any suitable means, such as by a roller bearing 48 and support bracket 46. This embodiment of the flow modifying operates as follows:

FIG. 3 shows the swirler in its open position. The vane assembly 29 is positioned such that the surfaces 34 and 35 of the vanes 30 are aligned with the surfaces 26*a* and 26*b* respectively of the plate 23. Thus, the channels 33 of the vane assembly 29 are aligned with the channels 24 of the plate 23 such that the maximum amount of air passes through them. The direction that the air will flow as it is discharged from the slots 33 and openings 24, that is, its swirl angle, is determined by the angle that the surfaces 34, 35, 26*a*, and 26*b*, which are preferably parallel, make with the displaced axis 27*a*.

Figure 4:
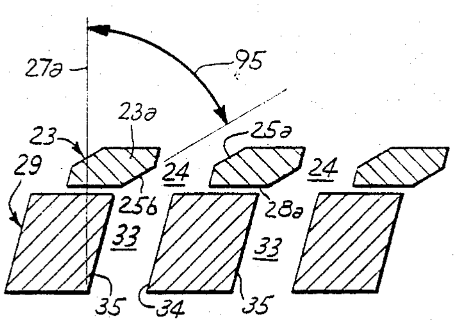

FIG. 4 shows the vane assembly 29 after it has been rotatably positioned to an intermediate position. Part of the air flowing through each of the channels 33 of the vane assembly 29 impinges upon and is turned by a surface 25*b* of the plate 23. This part of the air causes the remainder of the air flowing through the channel 33 to also be turned and flow across the adjacent surface 25*a*.

Figure 5:
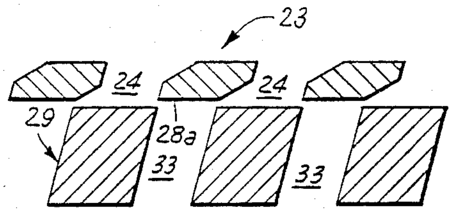

FIG. 5 shows the vane assembly 29 after it has been rotatably positioned to the closed position. The surfaces 28*a* of the plate 23 block the channels 33 such that substantially no air can flow through the channels 33 or channels 24. When the vane assembly 29 is in the closed position, the only air entering the combustion chamber 20 through the swirler 22 would be that flowing from the venturis 38 through the interior of the swirler hub 36, as can be seen in FIG. 1, or through the dilution holes 22D in FIG. 6.

Accordingly, an invention has been described in which a register plate valve for throttling axially flowing air is incorporated into a combustor in a gas turbine engine. The second plate 29 of the valve as shown in FIGS. 3–5 includes a plurality of vanes 30 which are positioned in a radial array as shown in FIG. 2. The vanes 30 resemble parallelograms in cross sections as shown in FIG. 3. The distance 75 between adjacent faces 34 and 35 at a given radius such as radius 78 in FIG. 2 does not change in the downstream direction. That is, distance 75*a* in FIG. 3 equals downstream distance 75*b*, so that the width of the channel 33 does not change in the downstream direction. Faces 34 and 35 make a first swirl angle 80 with the radially displaced longitudinal axis 27*a*. This angle 80 is preferably within the approximate range of 15 to 30 degrees.

The first plate 23 contains a radial array of vanes 23A as shown in FIG. 2 which are hexagonal in cross section as shown in FIGS. 3–5. Opposite faces of the hexagonal cross sections are parallel. (That is, faces 25*a* and *b* are parallel, faces 26*a* and *b* are parallel, and faces 28*a* and *b* are parallel.) Faces 26*a* and 26*b* define an angle with the displaced axis 27*a* which is the same as angle 80. Thus, when the first and second plates 23 and 29 are positioned as shown in FIG. 3, the faces 26*b* and 35 are aligned along line 83 and faces 26*a* and 34 are aligned along line 85 (that is, the respective faces are colinear with the corresponding lines 83 or 85.) In such a case, a continuous channnel including channel subparts 24 and 33 is defined by these faces. The air flowing through the channel is imparted a swirl angle determined by angle 80. A gap 88 is shown between the two plates 23 and 29, but this is illustrative only. The gap is actually of the order of one thousandth inch and no appreciable airflow travels along the gap in the directions of arrows 90. The register plate throttle is preferably dimensioned so that approximately fifteen percent of the air entering the combustor does so through this throttle, as positioned in FIG. 3. The remainder enters through venturis 38 and dilution holes 22*d* of FIG. 6.

The operating regime shown in FIG. 3 and just described is used during takeoff and cruise conditions of aircraft flight. The regime used for idle conditions is shown in FIG. 4. In FIG. 4, the first plate 23 has been rotated so that the vanes 23*a* partially obstruct the channels 33 of the second plate 29. In such a case, the swirl angle of the air is dominated by the angle 95 which faces 25*a* and *b* make with the displaced axis 27*a*. Faces 25*a* and *b* define a flow channel and are parallel in cross section. The angle 95 is preferably within the approximate range of 50 to 70 degrees.

Under the conditions of FIG. 4, a large swirl angle 95 is imparted to the air and consequently a larger residence time of the air in the combustor is imparted as compared with the residence time of FIG. 3. This larger residence time promotes fuller combustion of fuel at idle. The throttle valve is preferably dimensioned so that, at idle, under the conditions of FIG. 4, about five percent of the combustor airflow is supplied by the register plate throttle and the remainder is supplied by venturis 38 and dilution holes 22*d* in FIG. 6.

The operating regime of FIG. 5 is used during engine ignition (i.e., "lightoff"). The register plate throttle closes off all airflow to provide a very rich fuel mixture.

Figure 7:
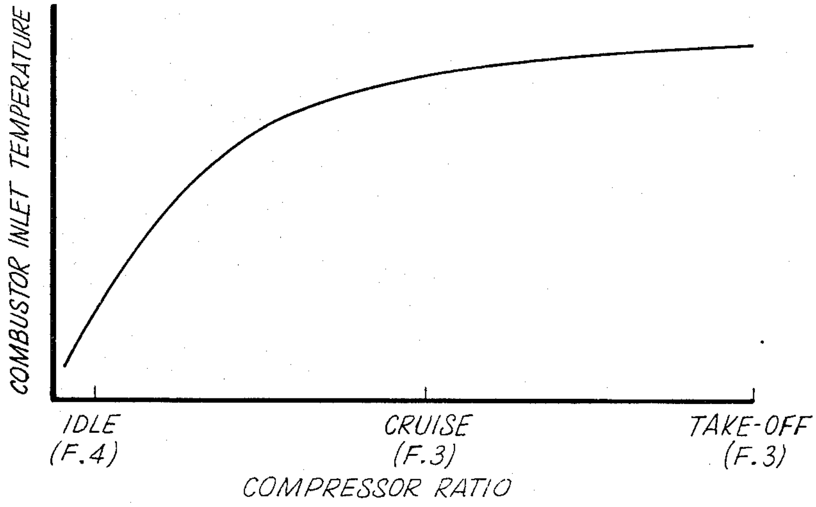
FIG. 7 is a plot of combustor inlet temperature as a function of compressor pressure ratio.

Some important aspects of the present invention are now discussed with reference to FIGS. 6, 7, and 8. FIG. 7 is a plot of combustor inlet temperature as a function of engine compressor ratio. NOx production is a function of this temperature. The three operating conditions corresponding to FIGS. 3 and 4 are indicated in FIG. 7 of FIGS. 3 and 4 being abbreviated as "F3" and "F4".

Figure 8:
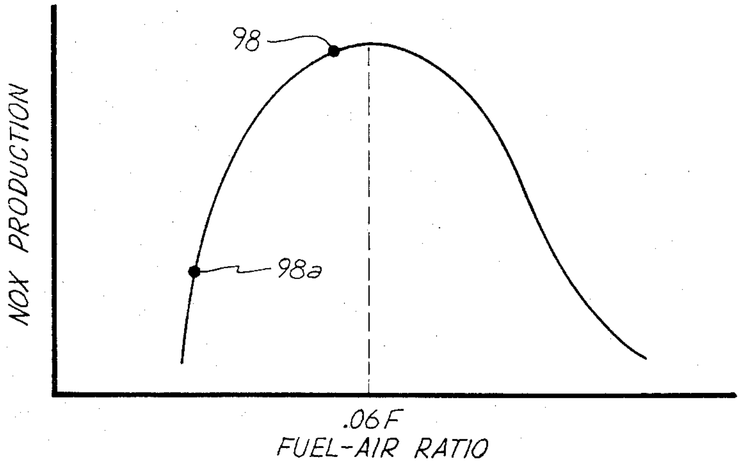
FIG. 8 is a plot of NOx production as a function of fuel-air ratio.

FIG. 8 is a plot of NOx production as a function of combustor fuel-air ratio. NOx production peaks at the stoichiometric ratio, which is approximately 0.067 by weight. The stoichiometric ratio is that at which the air present contains exactly the amount of oxygen needed to completely burn fuel into carbon dioxide and water vapor. One explanation for this peak at the stoichiometric ratio is that the combustor temperature tends to be highest at this ratio and consequently, since NOx production is temperature-sensitive, NOx production is also highest.

In considering FIGS. 7 and 8 together, one sees that, under the regime of FIG. 3 (takeoff or cruise), combustor inlet temperature is much higher than at idle, and so NOx production tends to be similarly higher for this reason. However, as discussed in connection with FIG. 3, use of the regime of FIG. 3 results in a high airflow rate, low residence time, and lean fuel-air ratios within the combustor as shown by point 98*a* in FIG. 8. Consequently, despite the higher combustor inlet temperature, the lowered residence time subjects atmospheric nitrogen to high temperatures for a short time, thus promoting lessened NOx production. Also, as illustrated in FIG. 8, the lean fuel-air ratio results in a low NOx production rate. Calculations made in conjunction with experimental evidence indicates that the regime of FIG. 3 results in NOx production of about 15 to 20 pounds per thousand pounds of fuel, compared to 40 to 50 lbs/1000 lbs. fuel for conventional combustion systems.

During idle, using the regime of FIG. 4, several factors affect NOx production. (At idle, fuel control means known in the art reduces fuel supplied to the combustors.) The lowered combustor inlet temperature, as shown in FIG. 7, tends to reduce NOx production. However, the engine at idle is preferably run at a fuel-air ratio which is at or near stoichiometric, as shown by point 98 in FIG. 8. This tends to increase NOx production. Further, the increased swirl angle of FIG. 4 tends to increase residence time in the combustor as does the reduced airflow under idle conditions. Both of these factors tend to increase NOx production, in exposing atmospheric nitrogen to high combustor temperatures for longer times. However, calculation and experiment indicate that the use of the regime in FIG. 4 results in reduced NOx production of about three to four pounds NOx per thousand pounds of fuel. The lowered combustor inlet temperature of the idle conditions of FIG. 4 is thus, in a sense, the dominating factor in NOx production, despite the upward influence on NOx production of low flow rate, high swirl angle, stoichiometric ration, and increased residence time, all of which are associated with the regime of FIG. 4.

In addition, the stoichiometric fuel-air ratio, the high swirl angle and the increased residence factor time of FIG. 4 serve to promote more complete combustion, thereby reducing carbon monoxide (CO) and hydrocarbon (HC) production.

Figure 9:
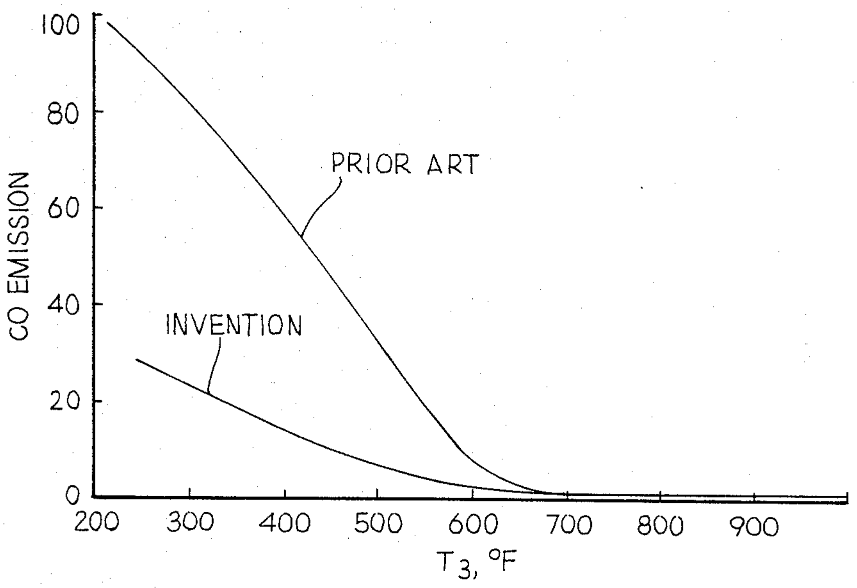
FIGS. 9, 10, and 11 are plots of emissions versus combustor inlet temperature.
Figure 10:
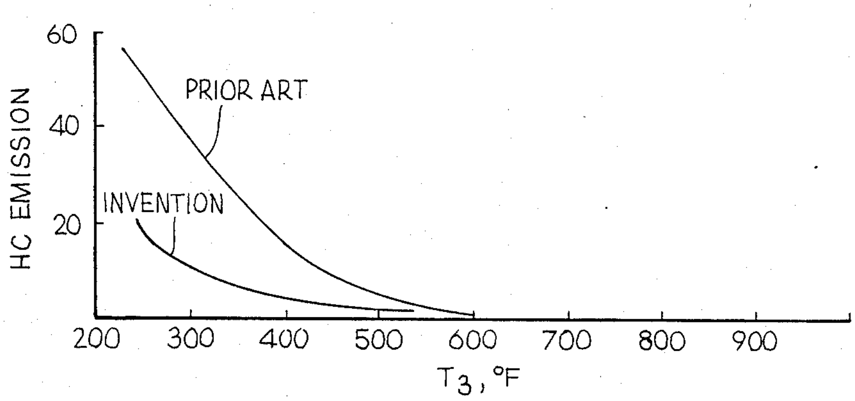
Figure 11:
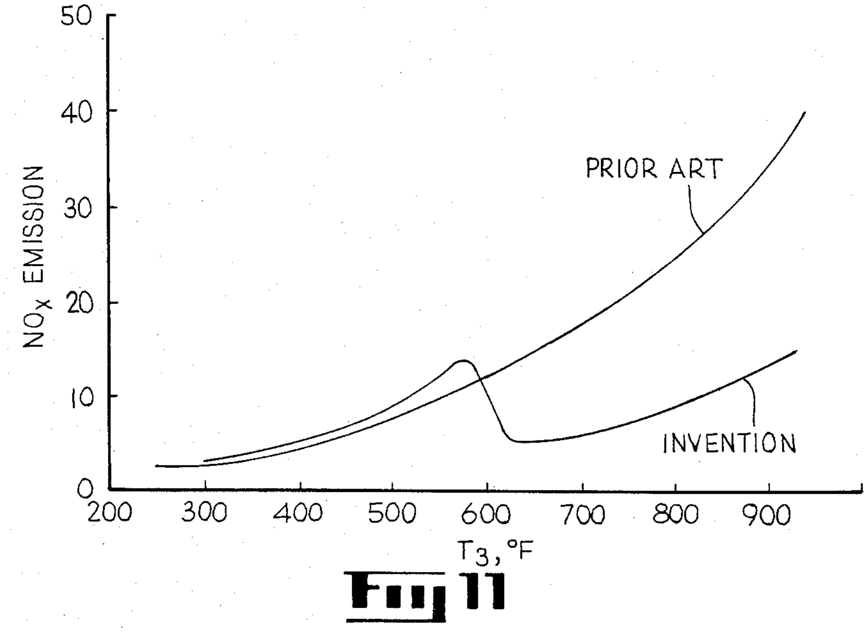

Some of these performance characteristics of the present invention are further illustrated in FIGS. 9–11. FIG. 9 is a plot of carbon monoxide (CO) produced versus combustor inlet temperature ($T_3$), FIG. 10 is a plot of hydrocarbon emissions (HC) versus combustor inlet temperature and FIG. 11 is a plot of NOx emissions versus combustor inlet temperature. In all three plots, the gas quantity on the vertical axis (CO, HC, or NOx) has units of pounds of the gas produced per thousand pounds of fuel burned. In the three plots, the performance of the present invention, based on computations taken from experimental evidence, is labeled "invention," while the performance of a typical prior art combustor is labeled "prior art." The three plots are considered self-explanatory.

One of the principal merits of the present invention lies in the provision of three selectable positions of the register plate throttle. These are shown in FIGS. 3–5. These three positions provide two separate swirl angles and three separate aperture settings determined by the degree of obstruction of the channel 33 by the vanes 23 of the plate 23. Thus, the airflow rate (in pounds per second) is simultaneously controllable with the swirl angle. Further, the register plate throttle serves to shift airflow from the combustor dome to the dilution holes without the use of other components of variable geometry.

In the preferred embodiment, operation of the register plate throttle is restricted to one of the three regimes shown in FIGS. 3–5, and no others. For example, a regime intermediate those of FIGS. 3 and 4 is not contemplated. Therefore, once designed, the combustor is configured to operate in either a first regime having a first airflow and first swirl angle, in a second regime having a second airflow and second swirl angle, or a third regime having zero airflow and no swirl angle.

It is to be understood that this invention is not limited to the particular embodiment disclosed, and it is intended to cover all modifications coming within the true spirit and scope of this invention as claimed.

We claim:

1. In a register plate throttle which surrounds a fuel injection nozzle, the improvement comprising:
   (a) means for providing a first, relatively low, swirl angle at a relatively high airflow regime;
   (b) means for providing a second, relatively high swirl angle at a relatively low airflow regime; and
   (c) means for terminating airflow in a third airflow regime.

2. In a gas turbine engine combustor, the improvement comprising:
   first and second parallel, relatively rotatable register plates through which axially directed airstreams flow, both plates including a radial array of vanes which define channels between adjacent vanes, the channels in the first plate defining a first swirl angle and the channels in the second plate defining both a second swirl angle similar to the first and a third swirl angle, wherein:
   (a) alignment of the plates in a first predetermined position causes air flowing through them to
      (i) acquire a swirl angle chiefly determined by the first swirl angle and
      (ii) acquire a first flow rate;
   (b) alignment of the plates in a second predetermined position causes air flowing through them to
      (i) acquire a swirl angle chiefly determined by the third swirl angle and
      (ii) acquire a second flow rate lesser than the first flow rate;
   (c) alignment of the plates in a third predetermined position causes airflow through them to terminate.

3. A swirler for a gas turbine engine combustor, comprising;
   a register plate throttle for simultaneously adjusting combustor flow rate, swirl angle, residence time, and fuel-air ratio for producing three regimes of combustion, including:
   (a) a first regime in which fuel-air ratio is less than stoichiometric, NOx produced is at a first NOx level, and combustor flow rate is at a first flow rate;
   (b) a second regime in which fuel-air ratio is closer to stoichiometric than in the first regime, NOx production is at a second level less than the first NOx level, and combustor flow rate is substantially less than the first flow rate; and (c) a third regime in which fuel-air ratio is greater than stoichiometric and combustor flow rate is less than either flow rate of (a) or (b), in which the register plate throttle comprises two axially adjacent arrays of vanes such that (d) one of the arrays defines a first swirl angle (e) the other of the arrays defines a second swirl angle similar to the first swirl angle and defines a third swirl angle whereby the first swirl angle of (d) chiefly determines the swirl angle of the combustor air in the first regime of (a) and the third swirl angle of (e) chiefly determines the swirl angle of the combustor air in the second regime of (b).

4. A method of operating a gas turbine engine comprising the following steps:

(a) using a register plate swirler which surrounds at least one fuel nozzle in at least one combustor, providing a relatively high airflow therethrough at a relatively low swirl angle for (i) providing a fuel-air mixture for combustion in the combustor having a fuel-air ratio which is less than stoichiometric and (ii) providing a relatively reduced residence time of the fuel-air mixture in the combustor;

(b) using the register plate swirler, providing a relatively low airflow therethrough at a relatively high swirl angle for (i) providing a fuel air mixture for combustion in the combustor having a fuel-air ratio which is greater than stoichiometric for less-than-peak NOx production, (ii) providing a relatively increased residence time of the fuel-air mixture in the combustor; and (c) using the register plate swirler, terminating airflow therethrough for providing a rich mixture to the combustor.

* * * * *